United States Patent
Koshiba et al.

[11] Patent Number: 5,545,468
[45] Date of Patent: Aug. 13, 1996

[54] RECHARGEABLE LITHIUM CELL AND PROCESS FOR MAKING AN ANODE FOR USE IN THE CELL

[75] Inventors: Nobuharu Koshiba, Nara-ken; Kenichi Takata, Osaka; Emi Asaka, Osaka; Makoto Nakanishi, Osaka, all of Japan

[73] Assignee: Matsushita Electric Industrial Co., Ltd., Osaka, Japan

[21] Appl. No.: 213,900

[22] Filed: Mar. 16, 1994

[30] Foreign Application Priority Data

Mar. 17, 1993 [JP] Japan .................................. 5-057243

[51] Int. Cl.⁶ ........................................................ H01M 4/02
[52] U.S. Cl. .......................... 429/218; 429/114; 429/197
[58] Field of Search ........................... 429/218, 194, 429/197, 129; 423/138, 179.5

[56] References Cited

U.S. PATENT DOCUMENTS

| | | | |
|---|---|---|---|
| 4,507,371 | 3/1985 | Thackeray et al. | 429/191 |
| 5,147,739 | 9/1992 | Beard | 429/194 |
| 5,160,712 | 11/1992 | Thackeray et al. | 423/138 |
| 5,187,033 | 2/1993 | Koshiba | 429/194 |

FOREIGN PATENT DOCUMENTS

| | | |
|---|---|---|
| 0567149 | 10/1993 | European Pat. Off. . |
| 57-152669 | 9/1982 | Japan . |
| 63-1708 | 1/1988 | Japan . |

OTHER PUBLICATIONS

"Metal Oxides of Group I and IV as Cathode Materials for Nonaqueous Lithium Cells" The Electrochemical Society of Japan; vol. 46, No. 7, Jul. 1978; pp. 407–410.

"Structure and Electrochemistry of the Spinel Oxides LiTi2O4 and Li4/3Ti5/3O4 by M. K. Colbow, et al," Journal of Power Sources, vol. 26, No. 3/4, May 16, 1989, pp. 397–402.

Structure & Electrochemistry of the Spinel Oxide Liti₂ O4 +Li 4/3 Ti5₃ O4 by M. K. Colbow et al, Journal of Power Sources, vol. 26, Nov. 3/4, May 16, 1981.

Primary Examiner—M. Nuzzolillo
Attorney, Agent, or Firm—Lowe, Price, LeBlanc & Becker

[57] ABSTRACT

A rechargeable lithium cell comprises a cathode having a discharge potential not less than 2 V relative to a Li/Li⁺ anode, an anode capable of doping and un-doping lithium and made of a material comprising a lithium titanate having a spinel structure and represented by the general formula, $Li_xTi_yO_4$ wherein $0.8 \leq x \leq 1.4$ and $1.6 \leq y \leq 2.2$, a separator separating the cathode and the anode from each other, and an electrolytic solution impregnated at least in the separator and dissolving a lithium salt in a non-aqueous solvent. When subjected to X-ray diffraction analysis, the material has peaks at least at 4.84±0.02 angstroms, 2.53±0.02 angstroms, 2.09±0.02 angstroms and 1.48±0.02 angstroms and a ratio of a peak intensity at 4.84±0.02 angstroms and a peak intensity at 1.48±0.02 angstroms of 100:30±10. The material may consist of the lithium titanate or mixed crystals of the lithium titanate and rutile-type titanium dioxide. A process for making the anode is also described.

13 Claims, 3 Drawing Sheets

RECHARGEABLE LITHIUM CELL AND PROCESS FOR MAKING AN ANODE FOR USE IN THE CELL

BACKGROUND OF THE INVENTION

1. Field of the Invention

This invention relates to a rechargeable lithium cell which is adapted for use as a mobile power source and a power source for memory backup. The invention also relates to a process for making an anode particularly suitable for use in the rechargeable lithium cell.

2. Description of the Prior Art

A recent progress of technology in the fields of electronics expedites miniaturization of electronic devices. As a power source for such devices, there has been an increasing demand of cells which are small in size and light in weight with a high energy density. To this end, attention has been directed to rechargeable lithium cells using a lithium anode. Such cells have been studied worldwide.

However, when a rechargeable lithium cell using metallic lithium as an anode is subjected to repeated charge and discharge cycles, there arise disadvantages that the lithium is partly divided into fine pieces during the cycles and that dendrite of lithium is grown on the surface of the anode, thereby causing the anode to be deformed with the cycle life of the cell being very short.

In order to overcome the disadvantages, use of alloys and metal oxides as the anode has been investigated, including lithium and aluminium alloys, lead alloys occluding lithium therein, niobium pentoxide doped with lithium, titanium dioxide having an anatase crystal structure. Especially, for preventing the formation of lithium dendrite crystals, the metal oxides are superior to the alloys. Titanium dioxide exhibits a flat charge and discharge curve at a potential of approximately 1.5 V, with the great possibility that titanium oxide can be used as the anode of a rechargeable lithium cell. Alternatively, Japanese Patent Publication No. 63-1708 proposes the combination of an anode made of titanium oxide and a cathode made of manganese dioxide. However, the cell using such a combination as set forth above has not been put into practice yet because the potential is so low as 1 V and the cycle life is short.

As is known in the art, titanium dioxide has several types of crystal structures including blue kite, anatase and ruffle structures. Titanium dioxide having the anatase and rutile structures has been studied as the anode of the lithium cell as set out in "Electrochemistry 46. NO (1978) p. 407). The anatase structure exhibits a higher electrode capacity than the rutile structure and, thus, anatase-type titanium oxide has been rated high. Eventually, when used as the anode, anatase-type titanium oxide exhibits a higher capacity than rutile-type titanium dioxide. However, these titanium dioxides are liable to suffer breakage of crystal lattices when lithium ions are doped and un-doped, so that the cycle life characteristic of the resultant cell is not always good. Thus, the cell is degraded in capacity on repetition of the charge and discharge cycles.

SUMMARY OF THE INVENTION

It is accordingly an object of the invention to provide a rechargeable lithium cell which overcomes the disadvantages of the prior art cells wherein dendrite which will be formed during the course of charge and discharge cycles of the cells when using metallic lithium or lithium alloys can be completely prevented from being formed.

It is another object of the invention to provide a rechargeable lithium cell whereby a stable cycle life characteristic is ensured, e.g. at least 300 charge and discharge cycles are attained, with a high discharge potential.

It is a further object of the invention to provide a rechargeable lithium cell which comprises an anode comprised of lithium titanate having a spinel structure or mixed crystal of lithium titanate and rutile-type titanium dioxide.

It is a still further object of the invention to provide a process for making an anode which is adapted for use in rechargeable lithium cells.

According to one embodiment of the invention, there is provided a rechargeable lithium cell which comprises a cathode which has a discharge potential not smaller than 2 V relative to a $Li/Li^+$ anode, an anode capable of doping and un-doping lithium and made of a reaction product which comprises a lithium titanate compound having a spinel structure and represented by the general formula, $Li_xTi_yO_4$, wherein $0.8 \leq x \leq 1.4$ and $1.6 \leq y \leq 2.2$, a separator separating the cathode and the anode from each other, and an electrolytic solution impregnated at least in the separator and containing a lithium salt dissolved in a non-aqueous solvent when-subjected to X-ray diffraction analysis using a Cu target, said reaction product has diffraction peaks at least at 4.84±0.02 angstroms, 2.53±0.02 angstroms, 2.09±0.02 angstroms and 1.48±0.02 angstroms and a ratio between peak intensifies at 4.84 angstroms±0.02 angstroms and at 1.48 angstroms±0.02 angstroms of 100:30±10. Preferably, the reaction product consists essentially of the lithium titanate compound or a mixed crystal product of the lithium titanate as defined above and rutile-type titanium oxide of the formula, $TiO_2$ whereby good cycle characteristics are obtained.

According to another embodiment of the invention, there is also provided a process for making an anode capable of doping and un-doping lithium in a rechargeable lithium cell of the type which comprises a cathode which has a discharge potential not smaller than 2 V relative to the anode, a separator separating the cathode and the anode from each other, and an electrolytic solution impregnated at least in the separator and containing a lithium salt dissolved in a non-aqueous solvent, which method comprising subjecting a lithium compound and titanium oxide to thermal treatment at an atomic ratio of Li/Ti in the lithium compound and titanium oxide, respectively, of 0.8:1 to 1:3 to under heating conditions sufficient to obtain a product comprising a lithium titanate compound having a spinel structure and represented by the general formula, $Li_{4/3}Ti_{5/3}O_4$, and forming the product to obtain an anode body.

DETAILED DESCRIPTION AND EMBODIMENTS OF THE INVENTION

Figure 1:
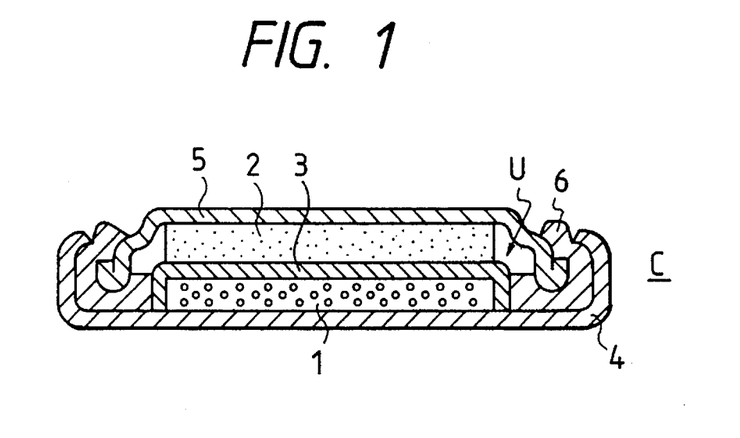
FIG. 1 is a schematic sectional view of a rechargeable lithium cell according to an embodiment of the invention.

Reference is now made to the accompanying drawings and particularly, to FIG. 1 which schematically illustrates a coin-shaped rechargeable lithium cell according to the invention.

In FIG. 1, there is generally shown a rechargeable lithium cell C which includes a cathode 1, an anode 2 and a separator 3 separating the cathode 1 and the anode 2 from each other, thereby forming a cell unit U. The cell unit U is encased in a metallic casing 4 which is in contact with the cathode 1 and thus serves also as a terminal for the cathode 1. The casing 4 has a metallic sealing cover 5 which is in contact with the anode 2 and thus serves as a terminal for the anode 2. The casing 4 and the sealing cover 5 are hermetically sealed and electrically insulated from each other by means of a gasket 6.

An electrolytic solution (not shown) which comprises a lithium salt dissolved in a non-aqueous solvent is impregnated at least in the separator 3. Usually, the cell unit is entirely impregnated with the electrolytic solution.

The cathode 1 may be made of any known materials which are ordinarily used in rechargeable lithium cells. For instance, vanadium pentoxide, $LiMn_2O_4$, $LiCoO_2$, $LiNiO_2$ and the like are used. In practice, these materials in the form of a powder are mixed with a conductive material such as carbon black and a binder such as a fluorine-containing resin (e.g. polytetrafluoroethylene), each present in an amount of not larger than 10 wt %, preferably not larger than 5 wt %, based on the total of the material for the cathode, conductive material and binder resin. The mixture is appropriately shaped, for example, into a disk, a sheet or the like and dried at appropriate temperatures of not lower than 200° C. to obtain a cathode of a desired shape.

It will be noted that where vanadium pentoxide which is free of lithium atoms is used as the cathode, it is necessary to electrochemically incorporate lithium as an active substance for the cell in the cathode on immersion in an electrolytic solution. This is particularly described in examples appearing hereinafter.

The separator 3 may be made of porous sheets such as of natural or synthetic materials. Such porous sheets may include non-woven and woven fabric sheets or membranes. Typical of the materials for the porous sheets are olefin polymers such as polypropylene, polyethylene, and the like. The separator for this purpose is well known in the art and is not described in detail herein.

The electrolytic solution used in the rechargeable lithium cell of the invention should contain a lithium salt dissolved in a non-aqueous solution. Examples of the lithium salt include $LiPF_6$, $LiCF_3SO_3$, $LiBF_4$, $LiClO_4$, $LiN(CF_3SO_2)_2$, and the like although not limited to those lithium salts. The solutes may be used singly or in combination. The non-aqueous solvent for the lithium salt solute includes, for example, carbonates such as ethylene carbonate, propylene carbonate, butylene carbonate and the like, 1,2-dimethoxyethane, 1,2-diethoxyethane, and the like. Usually, mixtures of these compounds are used although usable on their own. Preferably, the lithium salt should be present in the electrolytic solution at a concentration of 0.5 moles per liter of the solvent to its saturation.

The casing 4, the sealing cover 5 and the gasket 6 are not specific ones and may, respectively, be made of those materials which are ordinarily used in the art. For instance, the casing 4 and the sealing cover 5 may, respectively, be made of stainless steels or the like. The gasket 6 which serves to electrically insulate the casing 4 and the sealing cover 5 from each other may be made of insulating materials such as polyolefins and any other insulating resins.

The cell of the invention may take any forms such as a disk, a sheet or the like.

The present invention is characterized in that the anode 2 is made of a reaction product which comprises a lithium titanate compound having a spinel structure and represented by the general formula, $Li_xTi_yO_4$, wherein $0.8 \leq x \leq 1.4$ and $1.6 \leq Y \leq 2.2$. Fundamentally, $x+y \approx 3$. When subjected to X-ray diffraction analysis using a Cu target, the product which comprises the lithium titanate has diffraction peaks at least at 4.84±0.02 angstroms, 2.53±0.02 angstroms, 2.09±0.02 angstroms and 1.48±0.02 angstroms with the ratio between the peak intensities at 4.84 angstroms and at 1.48 angstroms (each±0.02 angstroms) of 100:30±10. The reaction product may be one which is obtained by reaction between a lithium compound or its mixture with metallic lithium and titanium oxides.

The anode made of the reaction product is advantageous in that dendrite which will be formed during the repetition of charge and discharge cycles when using known anodes made of metallic lithium or lithium alloys is completely prevented from being formed and that stable charge and discharge cycle characteristics are obtained, e.g. at least 300 charge and discharge cycles are possible. The anode should be used in combination with a cathode which exhibits a charge potential, relative to $Li/Li^+$, of not smaller than 2 V, by which a cell voltage of approximately 2 V can be obtained. Such cathode materials are those set out hereinbefore.

The lithium titanate compound should have diffraction peaks of at least at 4.84±0.02 angstroms, 2.53±0.02 angstroms, 2.09±0.02 angstroms and 1.48±0.02 angstroms, with the ratio between the peak intensities at 4.84 angstroms and at 1.48 angstroms (each±0.02 angstroms) of 100:30±10.

With anatase-type titanium dioxide, crystal lattices are liable to break owing to the doping and un-doping of lithium ions as will be occur during charge and discharge cycles. With the reaction product comprising a lithium titanate or consisting essentially of the titanate, it is assumed that doping and un-doping of lithium ions proceed smoothly and the crystal form of the titanate is unlikely to suffer breakage owing to the doping and un-doping cycles.

Typical examples of the lithium titanate compound include $LiTi_2O_4$, $Li_{4/3}Ti_{5/3}O_4$, and $Li_{0.8}Ti_{2.2}O_4$. These lithium titanates, respectively, have diffraction peaks and peak ratios shown in Table 1 below when subjected to X-ray diffraction analysis using a Cu target.

TABLE 1

| Crystal System | Typical X-ray Diffraction Peak Position (angstroms) | Peak Intensities relative to the intensity at 4.48 angstroms |
|---|---|---|
| $LiTi_2O_4$ | 4.85 | 100 |
| | 2.53 | 40 |
| | 2.09 | 55 |
| | 1.61 | 17 |
| | 1.48 | 30 |
| $Li_{4/3}Ti_{5/3}O_4$ | 4.83 | 100 |
| | 2.52 | 45 |
| | 2.09 | 60 |
| | 1.48 | 35 |
| | 4.85 | 100 |
| | 2.53 | 60 |
| $Li_{0.8}Ti_{2.2}O_4$ | 2.10 | 75 |
| | 1.46 | 30 |

As will apparent from Table 1, these lithium titanates have peak positions which are very close to one another. More particularly, the four peak positions at 4.84 angstroms, 2.53 angstroms, 2.09 angstroms and 1.48 angstroms are all within a range of ±0.02 angstroms. In addition, the ratio of the peak intensities at 4.84 and 1.48 angstroms, each ±0.02 angstroms, is 100:30±10.

Other peak intensities differ only slightly. This is considered for the following reasons. Since the ionic radii of lithium and titanium in the crystals are very close to each other, lithium and titanium ions are mutually moved depending on the slight difference in temperature and the manner of treatment, thereby permitting part of the lithium and titanium ions to be substituted with each other. This entails only a slight degree of deviation in the crystals owing to the substitution of lithium with titanium and vice versa. Nevertheless, when subjected to X-ray diffraction analysis, such a slight degree of deviation brings about differences in the peak intensity and influences positions of peaks other than the main peak. This eventually leads to formation of lithium titanates which have, respectively, different stoichiometric numbers of the lithium and titanium atoms. Although these lithium titanates are different in the stoichiometric numbers of atoms, they have substantially the same crystal form and typical peak positions. Thus, the lithium titanates of the formula defined hereinbefore are considered to have the same fundamental skeletal structure. From the foregoing, it is assumed that these lithium titanates are capable of doping and un-doping lithium ions in a similar way.

The lithium titanate analogs have been described with respect to the X-ray diffraction peak intensities and positions. In view of the ease in preparation and the chemical stability of the lithium titanates, $Li_{4/3}Ti_{5/3}O_4$ is preferred.

Preparation of the lithium titanates is described.

$Li_{4/3}Ti_{5/3}O_4$ is readily prepared by subjecting a mixture of a lithium compound selected from LiOH and $Li_2CO_3$ and anatase or rutile-type titanium dioxide to thermal treatment at a temperature sufficient to provide a product comprising $Li_{4/3}Ti_{5/3}O_4$, e.g. in a range of higher than 700° C. to lower than 1000° C., in an atmosphere of oxygen, air or nitrogen for a time of 3 to 24 hours. When the lithium compound and titanium dioxide are mixed at an atomic ratio between Li and Ti in the respective starting compound of 0.8:1 to 1:1 at approximately 850° C., substantially pure $Li_{4/3}Ti_{5/3}O_4$ is obtained.

When the temperature is not higher than 700° C., the X-ray diffraction peaks inherent to the lithium titanate are so weak that a substantial amount of the anatase or rutile-type titanium oxide is left in the mixture. Such a product cannot satisfy the requirements for the peak positions and peak intensities defined before. This will be particularly described in Example 1 appearing hereinafter.

In this connection, when the reaction temperature is not so high as slightly over 700° C. and the atomic ratio between Li and Ti in the lithium compound and anatase or rutile-type titanium dioxide, respectively, is in the range of 1:1 to 1:3, the resultant product may contain a substantial amount of the starting titanium oxide therein. However, if the resultant product has such X-ray diffraction peaks and peak intensity ratio as set out hereinbefore, this can be used as a material for the anode of the invention. This is because $Li_{4/3}Ti_{5/3}O_4$ is formed in the product in an amount sufficient to ensure cell characteristics.

If the thermal treatment is effected at an atomic ratio between Li and Ti of 1:1.5 to 1:3 at a temperature of 800° to 950° C., a mixed crystal product of $Li_{4/3}Ti_{5/3}O_4$ and rutile-type titanium dioxide can be obtained even when anatase-type titanium dioxide is used as the starting material.

The mixed crystal product has not only the X-ray diffraction peaks corresponding to $Li_{4/3}Ti_{5/3}O_4$, but also additional peaks, whose intensities increase significantly, appearing at 3.25±0.02 angstroms, 2.49±0.02 angstroms, 2.19±0.02 angstroms, and 1.69±0.02 angstroms. The ratios of the peak intensities at 3.25 angstroms, 2.49 angstroms and 1.69 angstroms are 100:50±10:60±10 for the mixed crystal product useful in the present invention.

In view of the cycle characteristic, not only pure $Li_{4/3}Ti_{5/3}O_4$, but also the mixed crystal product of the lithium titanate and rutile-type titanium dioxide is preferably used with similar good results. This is because the mixed crystal product obtained by the thermal treatment of the invention is not a mere mixture of a lithium titanate compound and rutile-type titanium oxide but is one in which both crystals coexist in individual grains or particles in the form of mixed crystals. Such a mixed crystal product is considered to bring about a good effect on the cycle life when applied to the anode of the cell. Preferably, the content of rutile-type titanium dioxide in the mixed crystal is up to 20 wt % of the mixed crystal product. This is because if the content of rutile-type titanium dioxide is too large, a high cell capacity is unlikely to obtain.

In the practice of invention, both pure $Li_{4/3}Ti_{5/3}O_4$ and the mixed crystal product of the lithium titanate and rutile-type titanium dioxide are preferably used as a material for making the anode although any product which has such diffraction peaks as defined before may be likewise used as the anode. Broadly, the atomic ratio between Li in a starting lithium compound and Ti in starting titanium dioxide used in the preparation process is in the range of 0.8:1 to 1:3.

The thermal treatment is feasible to a temperature which is close to a melting point of titanium dioxide, i.e. approximately 1000° C. In view of the thermal efficiency, the temperature should preferably be as low as possible.

If the thermal treatment temperature is close to and higher than 1000° C., $Li_2Ti_3O_7$ is predominantly produced. This $Li_2Ti_3O_7$ product per se does not contribute to improving the cycle characteristic.

$LiTi_2O_4$ is not easy to prepare and is prepared, for example, by the following procedures.

1)

This reaction proceeds at a temperature of 750° to 950° C. for several hours to 24 hours.

2) $Ti_2O_3 + Li_2Ti_2O_5 = 2\ LiTi_2O_4$.

The above reaction proceeds in a similar temperature range as in 1) in an atmosphere of hydrogen or an inert gas such as argon.

3) $LiTi_2O_4$ is obtained by reaction between amorphous titanium dioxide and butyl lithium to obtain $Li_{0.5}TiO_4$, followed by thermal treatment at approximately 450° C. to obtain $LiTi_2O_4$.

4) $LiTi_2O_4$ is obtained by arc-melting of $Li_2CO_3$, $TiO_2$ and Ti.

In the practice of the invention, $LiTi_2O_4$ product which satisfies the requirements for the X-ray diffraction peak positions and has thus a spinel structure can be likewise used irrespective of the manner of the preparation.

The $LiTi_2O_4$ product which may contain starting materials or other impurities depending on the reaction conditions including the reaction temperature, the reaction time, the mixing ratio or ratios of starting materials and the like. These products which do not consist of $LiTi_2O_4$ alone may be used as with the case of $Li_{4/3}Ti_{5/3}O_4$.

$Li_{0.8}Ti_{2.2}O_4$ may be prepared from $Ti_2O_3 + Li_2Ti_2O_5$ wherein $Ti_2O_3$ is used in an amount by mole smaller than the theoretical and the reaction is effected at 800° C. for 24 hours in an atmosphere of helium or argon.

As will be apparent from the preparation of lithium titanate compounds, the reaction product is obtained by reaction between a lithium compound and a titanium compound with or without further addition of metallic titanium or hydrogen in some cases. Such lithium compounds include lithium hydroxide and lithium carbonate for $Li_{4/3}Ti_{5/3}O_4$, and $Li_2Ti_2O_5$, butyl lithium and lithium carbonate for $LiTi_2O_4$, and $Li_2Ti_2O_5$ for $Li_{0.8}Ti_{2.2}O_4$. The titanium compound includes anatase or rutile type titanium dioxide for $Li_{4/3}Ti_{5/3}O_4$ and $Ti_2O_3$ and titanium dioxide for $LiTi_2O_4$, and $Ti_2O_3$ for $Li_{0.8}Ti_{2.2}O_4$.

For the fabrication of the anode of a rechargeable lithium cell, the reaction product comprising or consisting essentially of a lithium titanate which is in the form of a powder may be used by mixing with a conductive agent such as carbon black and a binder such as polytetrafluoroethylene and shaped into any desired form, followed by thermally treating at temperatures of 200° to 250° C. Preferably, the conductive agent is used in an amount of up to 5 wt % and the binder is used in an amount of up to 5 wt %. The mixture may be placed in a shaped metallic net and thermally treated.

The present invention is more particularly described by way of examples.

EXAMPLE 1

1 mole of lithium hydroxide and 1 mole of anatase-type titanium oxide were mixed and thermally treated at temperatures of 700° C., 800° C., 900° C., 950° C. and 1000° C. in an atmosphere of oxygen for 8 hours, respectively, thereby obtaining lithium titanate samples. These samples were each subjected to X-ray diffraction analysis using a Cu target. The X-ray diffraction peak positions and peak intensity ratios of the samples are summarized in Table 2 below. As will be described in more detail hereinafter, the samples obtained at 700° C. and 1000° C. are for reference and the samples at 800° C., 900° C. and 950° C. are those of the example of the invention.

TABLE 2

| Thermal Treatment Temperature (°C.) | X-ray Diffraction Peak Position (angstroms) | Peak Intensity Ratio | Thermal Treatment Temperature (°C.) | X-ray Diffraction Peak Position (angstroms) | Peak Intensity Ratio |
|---|---|---|---|---|---|
| 700 | 4.82 | 27 | 950 | 4.83 | 100 |
| | 3.52 | 100 | | 3.24 | 68 |
| | 2.50 | 7 | | 2.52 | 35 |
| | 2.38 | 19 | | 2.49 | 25 |
| | 2.07 | 18 | | 2.19 | 10 |
| | 1.90 | 25 | | 2.09 | 50 |
| | 1.70 | 14 | | 1.69 | 28 |
| | 1.67 | 15 | | 1.48 | 25 |
| | 1.48 | 11 | | | |
| 800 | 4.83 | 100 | 1000 | 4.44 | 100 |
| | 3.25 | 66 | | 3.25 | 80 |
| | 2.52 | 38 | | 2.69 | 30 |
| | 2.49 | 27 | | 2.51 | 17 |
| | 2.19 | 12 | | 2.49 | 34 |
| | 2.09 | 51 | | 2.46 | 15 |
| | 1.69 | 29 | | 2.19 | 15 |
| | 1.62 | 9 | | 2.24 | 20 |
| | 1.48 | 26 | | 1.77 | 18 |
| | | | | 1.69 | 37 |
| 900 | 4.83 | 100 | | | |
| | 3.25 | 66 | | | |
| | 2.52 | 37 | | | |
| | 2.49 | 27 | | | |
| | 2.19 | 12 | | | |
| | 2.09 | 48 | | | |
| | 1.69 | 28 | | | |
| | 1.48 | 25 | | | |

The comparison between Tables 1 and 2 reveals that the peaks of the lithium titanate samples are well coincident with those of $Li_{4/3}Ti_{5/3}O_4$ except for the samples obtained at 700° C. and 1000° C., respectively, and are close to those of $LiTi_2O_4$ or $Li_{0.8}Ti_{2.2}O_4$. Typical X-ray diffraction peak positions and intensity ratios of anatase-type titanium oxide and rutile-type titanium oxide are shown in Table 3 below.

TABLE 3

| Type of Titanium Oxide | Typical X-ray Diffraction Peak Position (angstroms) | Peak Intensity Ratio |
|---|---|---|
| Anatase-type Titanium Oxide | 3.52 | 100 |
| | 2.38 | 20 |
| | 1.89 | 35 |
| | 1.70 | 20 |
| | 1.67 | 20 |
| Rutile-type Titanium Oxide | 3.25 | 100 |
| | 2.49 | 50 |
| | 2.19 | 25 |
| | 1.69 | 60 |
| | 1.62 | 20 |

The comparison between Tables 2 and 3 reveals that the lithium titanate sample obtained by the thermal treatment at 700° C. contains a substantial amount of anatase-type titanium oxide although the lithium titanate is produced only in a small amount. Accordingly, the peaks inherent to the spinel structure are not so intense. This sample does not satisfy the requirement for the peak ratio between 4.82±0.02 and 1.48±0.02. Use of a temperature slightly higher than 700° C. is enough to meet the requirement for the peak intensity ratio.

In contrast, the lithium titanate samples obtained by the thermal treatment at 800° to 950° C. have sharp peaks of a lithium titanate along with peaks of rutile-type titanium dioxide. When the thermal treatment temperature is 1000° C., $Li_2Ti_3O_7$ is predominant.

From the above, it will be seen that a reaction product comprising the lithium titanate, which is useful as the anode of a rechargeable lithium cell of the invention, is obtained by thermal treatment at a temperature ranging from higher than 700° C. to 950° C. Such reaction products are characterized by its X-ray diffraction peak positions at least at 4.84±0.02 angstroms, 2.53±0.02 angstroms, 2.09±0.02 angstroms and 1.48±0.02 angstroms and also by the ratio between the peak intensities at 4.84 angstroms and at 1.48 angstroms (each ±0.02 angstroms) of 100:30±10. A reaction product having such peak positions and peak intensity ratio as set out above is effectively used in the practice of the invention even if the product contains anatase-type titanium dioxide therein.

Where rutile-type titanium dioxide is mixed in the crystals of a lithium titanate compound, additional in-tense peaks appear at 3.25±0.02 angstroms, 2.49±0.02 angstroms, 2.19±0.02 angstroms and 1.69±0.02 angstroms, with ratios of the peak intensities at 3.25 angstroms, 2.49 angstroms and 1.69 angstroms of 100:50±10:60±10.

90 parts by weight of each of these samples were provided, to which 5 parts by weight of carbon black as a conductive-agent and 5 parts by weight of polytetrafluoroethylene were added and mixed together. The mixture was packed and shaped in a disk-shaped stainless steel net to make a pellet having a thickness of about 0.5 mm and a diameter of 12.0 min. The thus packed net was subjected to vacuum drying at 250° C. and dehydration to provide a disk-shaped anode. Each lithium titanate sample was packed in an amount of 50 mg.

A rechargeable lithium cell of the type shown in FIG. 1 was fabricated using a cathode made of vanadium pentoxide and a discharge potential of 3.5 V relative to $Li/Li^+$ and the anode which was obtained from each lithium titanate sample and doped with lithium.

More particularly, a cell unit U was assembled, in a manner as shown in FIG. 1, using a cathode 1, the lithium-doped anode 2 and a separator 3 provided between the cathode 1 and the anode 2 and made of a polypropylene non-woven sheet. The cathode 1 was obtained by mixing 90 parts by weight of a vanadium pentoxide powder, 5 parts by weight of carbon black as a conductive agent and 5 parts by weight of polytetrafluoroethylene. The mixture was shaped into a pellet with a thickness of 0.8 mm and a diameter of 17.0 mm, followed by vacuum drying at 250° C. The electric capacity of the cathode was about 60 mAh at one electron equivalent and metallic lithium was pressed against the pellet in an amount corresponding to 60 mAh, followed by doping of the metallic lithium in vanadium pentoxide in a non-aqueous electrolytic solution. The cell unit was placed on a metallic casing 4 serving also as a cathode terminal, which was covered with a sealing cover 5 serving as an anode terminal and electrically isolated from the sealing cover 5 by means of a gasket 6. An electrolytic solution used was comprised of 1 mol of $LiPF_6$ dissolved in one liter of a mixed solvent of equal volumes of propylene carbonate (PC), ethylene carbonate (EC) and 1,2-dimethoxyethane (DME). The solution was impregnated in the cathode, anode and separator. The cell had a size of about 23 mm in outer diameter and about 3 mm in height.

The cells were referred to cell A1 (for reference), cell A2, cell A3, cell A4 and cell A5 (for reference) corresponding to the thermal treatment temperatures of 700° C., 800° C., 900° C., 950° C. and 1000° C., respectively.

EXAMPLE 2

0.5 moles of lithium carbonate and 1 mole of anatase-type titanium dioxide were mixed and thermally treated in an atmosphere of oxygen at 900° C. for 8 hours thereby obtaining a lithium titanate sample. The sample was subjected to X-ray diffraction analysis with the results of the peak position and peak intensity ratio shown in Table 4.

TABLE 4

| X-ray Diffraction Peak Position (angstroms) | Peak Intensity Ratio |
| --- | --- |
| 4.83 | 100 |
| 3.25 | 30 |
| 2.52 | 36 |
| 2.49 | 13 |
| 2.09 | 51 |
| 1.69 | 15 |
| 1.61 | 15 |
| 1.48 | 25 |
| 1.47 | 15 |

As will be apparent from the above table, the results of the X-ray diffraction analysis were substantially coincident with those of the lithium titanate samples of Example 1 obtained from lithium hydroxide and titanium oxide, revealing that the same lithium titanate compound as in Example 1 was formed.

This lithium titanate sample was used to make an anode in the same manner as in Example 1 and also to make a cell using the anode in the same manner as in Example 1 to provide cell B.

EXAMPLE 3

In cell B of Example 2, the electrolytic solution was replaced by an electrolytic solution of 1 mol of each of $LiClO_4$, $LiCF_3SO_3$, $LiN(CF_3SO_2)_2$, and $LiBF_4$ dissolved in one liter of a mixed solvent of PC, EC and DME in equal volumes, thereby providing cell C1, cell C2, cell C3 and cell C4, respectively.

EXAMPLE 4

In Example 1, the lithium titanate sample obtained by thermal treatment at 900° C. was used as the anode and lithium-containing spinel-type manganese dioxide, $LiMn_2O_4$, was used as a cathode, followed by the general procedure of Example 1 to make cell D.

EXAMPLE 5

The general procedure of Example 1 was repeated except that the lithium titanate sample obtained by thermal treatment at 900° C. was used as the anode and that lithium cobaltate ($LiC_oO_2$) was used as a cathode, thereby providing cell E.

EXAMPLE 6

The general procedure of Example 1 was repeated except that the lithium titanate sample obtained by thermal treatment at 900° C. and that lithium nickelate ($LiNiO_2$) was used as a cathode, thereby providing cell F.

For comparison, the general procedure of Example 1 was repeated except that anatase-type titanium oxide was used as the anode, thereby obtaining cell G for comparison.

Figure 2:
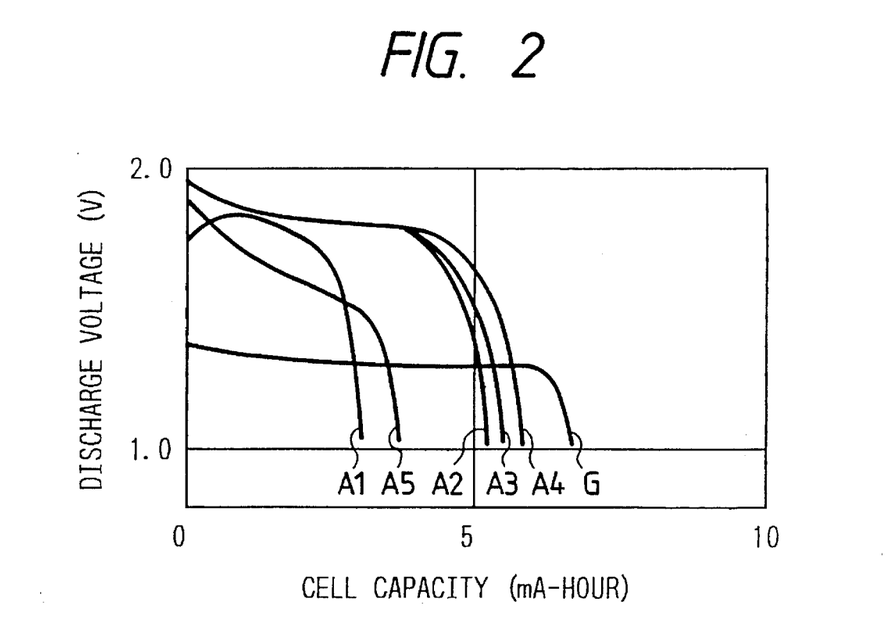
FIG. 2 is a discharge curve for different types of rechargeable lithium cells A-1 to A-5 using anodes of $Li_{4/3}Ti_{5/3}O_4$ obtained by thermal treatment at different temperatures, wherein the cells A1 and A5 are for reference and the cells A2 to A4 are those of the invention, and a cell G for comparison using anatase-type titanium oxide as the anode.

The cells A1 to A5 obtained in Example 1 and the cell G for comparison were each subjected to a test wherein each cell was charged at room temperature at a constant current of 1 mA to a level of 2.4 V and then discharged to 1.0 V to determine its capacity. The results are shown in FIG. 2.

The cells A1 to A5, G, B and C1 to C4 were each subjected to a charge and discharge cycle life test at room temperature. The cycle conditions were those indicated below.

Charging conditions included a constant current of 1 mA, a charging time of 10 hours and a charge cut voltage of 2.4 V.

Discharging conditions included a constant current of 1 mA, a discharging time of 10 hours and a charge cut voltage of 1.0 V.

Figure 3:
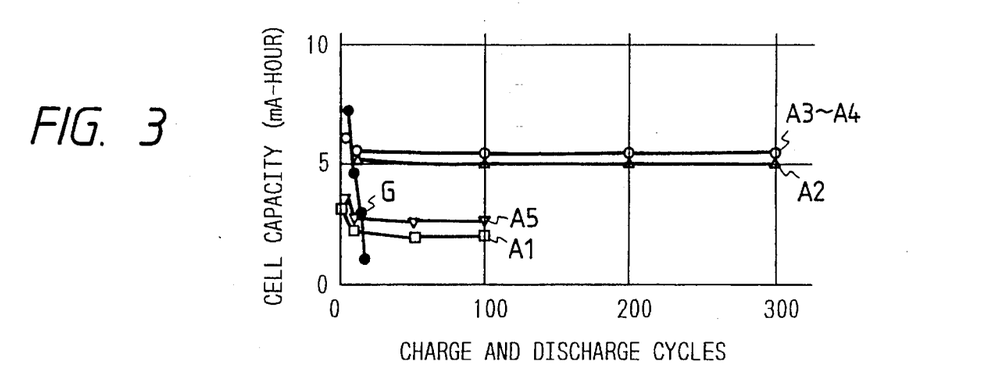
FIG. 3 is a graph showing a cycle life characteristic for rechargeable lithium cells A2 to A4 obtained in the example of the invention and the cells A1 and A5 for reference and a cell G for comparison.
Figure 4:
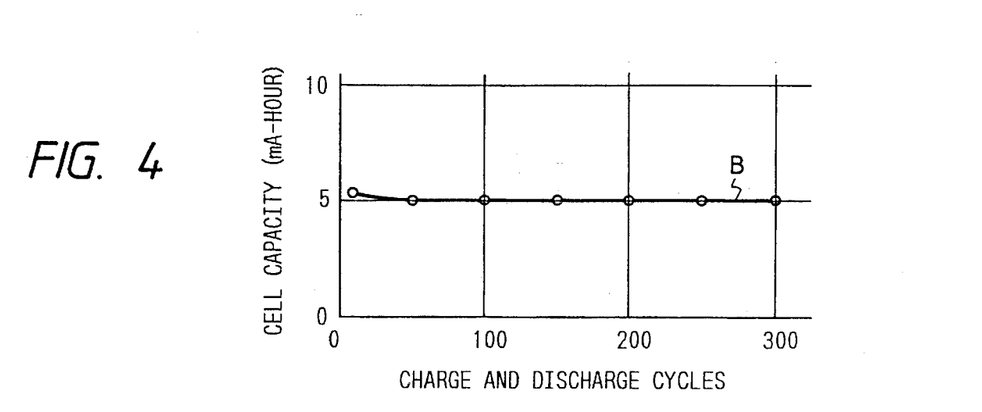
FIG. 4 is a graph similar to FIG. 3 but for a rechargeable lithium cell B obtained in another example of the invention.
Figure 5:
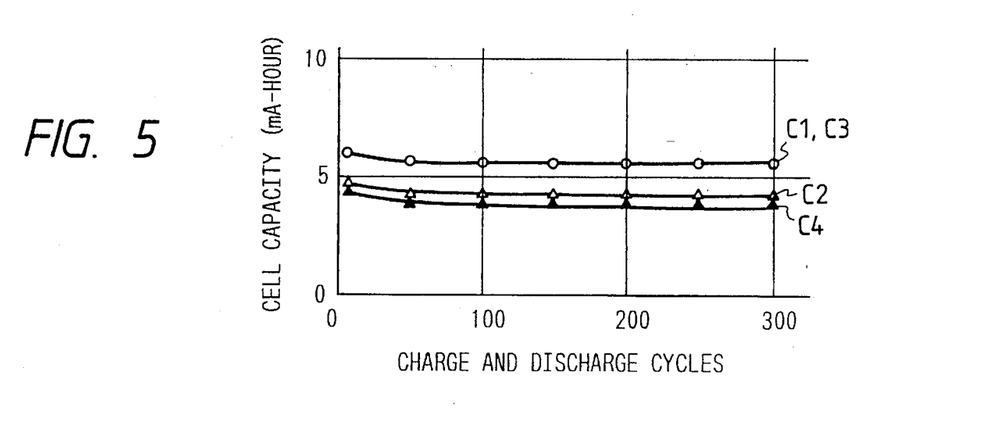
FIG. 5 is a graph similar to FIG. 3 but for rechargeable lithium cells C1 to C4 obtained in further examples of the invention.

The results of the cycle life test are, respectively, shown in FIGS. 3 to 5.

As will be apparent from FIG. 2, with the cell G using anatase-type titanium dioxide, the capacity is about 6.5 mAh and the capacitive density per unit weight of the titanium dioxide is as high as about 130 mAh/g, but the discharge voltage is as low as approximately 1.5 V.

The cells A1 and A5 for reference using the lithium titanate samples thermally treated at 700° C. and 1000° C., respectively, have a capacity as small as approximately 3 mAh. The cells A2 to A4 of the invention exhibit capacities ranging from not less than 5 mAh to less than 6 mAh, which are substantially the same as that of the cell G using anatase-type titanium dioxide. The capacitive density of the cells of the invention ranges from about 100 to 120 mAh/g. The cell A1 is slightly lower in discharge voltage but keeps a level of approximately 1.8 V. With the cells A2 to A4, the discharge voltage is stably held at 1.8 V. This means that when the thermal treatment is effected at 700° C., the resultant lithium titanate sample contains the starting anatase-type titanium oxide left in the sample in a substantial amount. On the other hand, with the samples obtained by thermal treatment at temperatures from 800° C. to 950° C., the lithium titanate compound having a spinel structure is predominantly produced, thus showing good effects of the lithium titanate on the discharge voltage. With the cell A5 making use of the sample obtained by thermal treatment at 1000° C., the discharge voltage characteristic is apparently inferior to those of the cells A2 to A4 and is similar to that of the cell A1. This is considered to result from the formation of $Li_2Ti_3O_7$, revealing that $Li_2Ti_3O_7$ is significantly inferior to the lithium titanate compound having a spinel structure when applied as the anode of the cell.

FIG. 3 reveals that the cell G for comparison is considerably degraded in capacity as the charge and discharge cycles proceed, i.e. the capacity is reduced to half within the 50 cycles.

With the cells A1 and A5 for reference, while the capacity is not so high, the cycle life is significantly improved over the cell G for comparison and the capacity is kept, at most, over 100 charge and discharge cycles.

As will be apparent from FIG. 3, with the cells A2 to A4, the initial capacities are substantially kept even after the 300 charge and discharge cycles. From this, it will be seen that the lithium titanate samples having a spinel structure and obtained by thermal treatment at temperatures ranging from 800° to 950° C. exhibit a very good charge and discharge cycle characteristic. Accordingly, the mixed crystal of the lithium titanate having a spinel structure and rutile-type titanium dioxide is effective with respect to the cycle characteristic.

FIG. 4 shows a cycle life characteristic of the cell B using a lithium titanate sample obtained from lithium carbonate and anatase-type titanium dioxide. This cycle life characteristic is substantially the same as that of the cell A2 shown in FIG. 3. This reveals that no difference appears when using either lithium hydroxide or lithium carbonate for the formation of the lithium titanate sample.

FIG. 5 shows a cycle life characteristic for the cells C1 to C4 using different types of solutes in electrolytic solutions, respectively. From the figure, it will be seen that the cell capacity is smaller for the solutes of $LiCF_3SO_3$ and $LiBF_4$. This is consider for the reason that the electrolytic solutions dissolving these lithium salts therein are smaller in conductivity. Accordingly, where a high rate discharge is required, it is preferred to use $LiPF_6$, $LiClO_4$, $LiCF_3SO_3$ and $LiN(CF_3SO_2)_2$.

Figure 6:
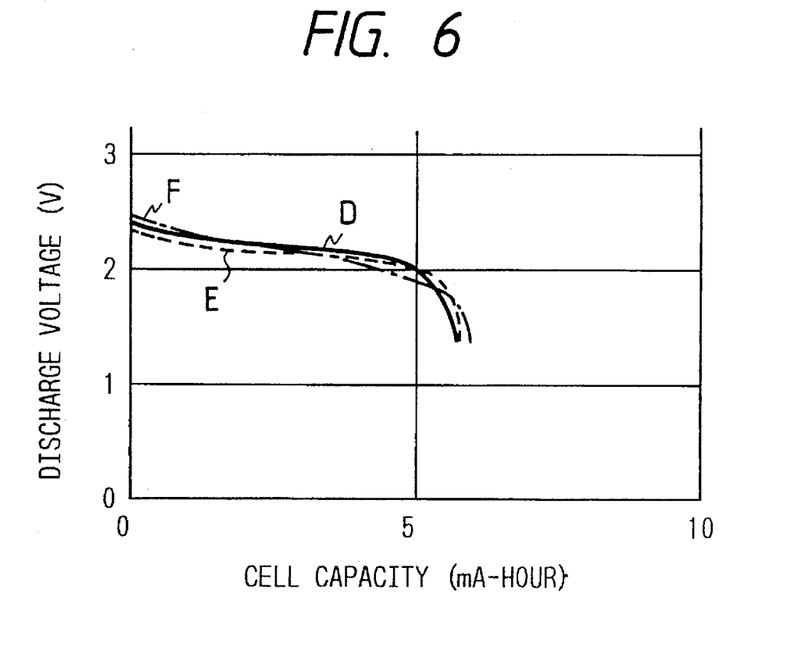
FIG. 6 is a discharge curve of rechargeable lithium cells D, E and F obtained in still further examples of the invention.

FIG. 6 shows a discharge curve of the cells D, E and F using $LiMn_2O_4$, $LiC_0O_2$ and $LiNiO_2$ as the anode, respectively. In all the cells, the discharge voltage is higher than that of the cell using the $V_2O_5$ anode, with a discharge voltage being kept at about 2.3 V.

Figure 7:
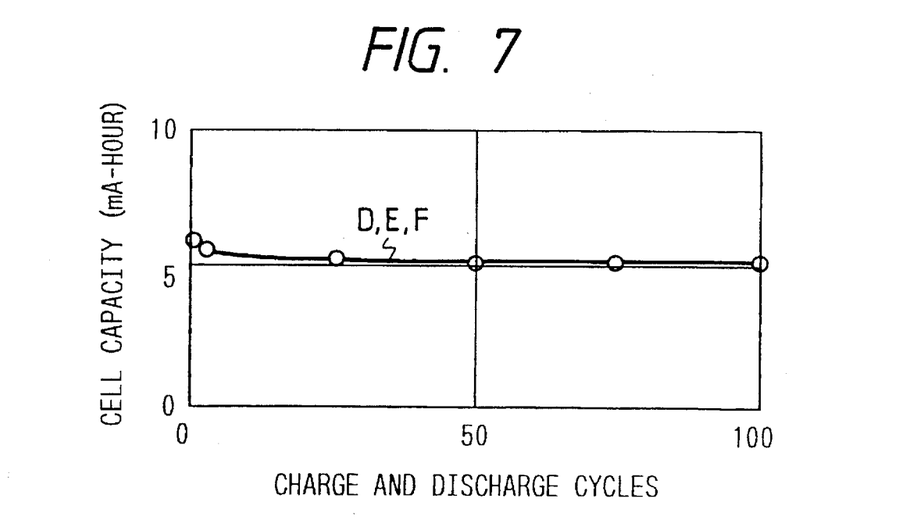
FIG. 7 is a graph showing a cycle life characteristic for the cells D, E and F of the invention.

FIG. 7 shows a charge and discharge cycle life characteristic for the cells D, E and F. In all the cells, the discharge voltage is stable over 100 charge and discharge cycles. It will be noted that the potential of lithium titanate is about 1.5 V and the anode used for this purpose is enough to have a discharge potential, relative to $LI/Li^+$, of not less than 2 V.

In these examples, anatase-type titanium dioxide is used as one of the starting materials for preparing the lithium titanate samples, and similar results are obtained when using rutile-type titanium dioxide. Further, although the thermal treatment is effected in the above examples in an atmosphere of oxygen, titanium oxide and lithium carbonate may be thermally treated in an atmosphere of other gases such as argon, nitrogen and air with similar results.

EXAMPLE 7

The general procedure of Example 1 was repeated except that $LiTi_2O_4$ was used as a material for anode, thereby fabricating a rechargeable lithium cell. $LiTi_2O_4$ was prepared using $Li_2O_3$ and $TiO_2$ in an atmosphere of hydrogen at 850° C. for 24 hours. The cell was subjected to measurements in the same manner as in Example, revealing similar results as of the cell A2 of Example 1 with respect to the cycle life and the relation between the discharge voltage and the cell capacity.

What is claimed is:

1. A rechargeable lithium cell which comprises a cathode which has a discharge potential not less than 2 V relative to a $Li/Li^+$ anode, an anode capable of doping and un-doping lithium comprising a lithium titanate which has a spinel structure and is a final product having the general formula, $Li_xTi_yO_4$, wherein $0.8 \leq x \leq 1.4$ and $1.6 \leq y \leq 2.2$, a separator separating the cathode and the anode from each other, and an electrolytic solution impregnated at least in the separator and containing a lithium salt dissolved in a non-aqueous solvent, wherein when subject to X-ray diffraction analysis using a Cu target, said reaction product has diffraction peaks at least at 4.84±0.02 angstroms, 2.53±0.02 angstroms, 2.09±0.02 angstroms and 1.48±0.02 angstroms and a ratio of a peak intensity at 4.84±0.02 angstroms and a peak intensity at 1.48±0.02 angstroms of 100:30±10.

2. The cell according to claim 1, wherein said anode consists essentially of the lithium titanate which has a spinel structure and is represented by the general formula, $Li_xTi_yO_4$, wherein $0.8 \leq x \leq 1.4$ and $1.6 \leq y \leq 2.2$.

3. The cell according to claim 2, wherein said lithium titanate consists essentially of $LiTi_2O_4$.

4. The cell according to claim 2, wherein said lithium titanate consists essentially of $Li_{4/3}Ti_{5/3}O_4$.

5. The cell according to claim 2, wherein said lithium titanate consists essentially of $Li_{0.8}Ti_{2.2}O_4$.

6. The cell according to claim 1, wherein said lithium salt in said electrolytic solution is a member selected from the group consisting of $LiPF_6$, $LiCF_3SO_3$, $LiBF_4$, $LiClO_4$, $LiN(CF_3SO_2)_2$ and mixtures thereof.

7. A rechargeable lithium cell which comprises:

a cathode which has a discharge potential not less than 2 V relative to a $Li/Li^+$ anode;

an anode capable of doping and un-doping lithium comprising mixed crystals of a lithium titanate which has a spinel structure and is a final product having the general formula, $Li_xTi_yO_4$, wherein $0.8 \leq x \leq 1.4$ and $1.6 \leq y \leq 2.2$ and rutile form of titanium dioxide;

a separator separating the cathode and the anode from each other; and an electrolytic solution impregnated at least in the separator and containing a lithium salt dissolved in a non-aqueous solvent, wherein when subjected to X-ray diffraction analysis using a Cu target, said final product has diffraction peaks at least at 4.84±0.02 angstroms, 3.25±0.02 angstroms, 2.53±0.02 angstroms, 2.49±0.02 angstroms, 2.19±0.02 angstroms, 2.09±0.02 angstroms, 1.69±0.02 angstroms, and 1.48±0.02 angstroms.

8. The cell according to claim 7, wherein said anode consists essentially of said mixed crystals.

9. The cell according to claim 7, wherein said lithium titanate and said rutile form at titanium oxide coexist in one mixed crystal.

10. The cell according to claim 7, wherein said final product has a ratio of a peak intensity at 4.84±0.02 angstroms and a peak intensity at 1.48±0.02 angstroms of 100:30±10 and ratios of a peak intensity at 3.25±0.02 angstroms, a peak intensity at 2.58±0.02 angstroms and a peak intensity at 1.69±0.02 angstroms of 100:50±10:60±10.

11. The cell according to claim 7, wherein said lithium titanate consists essentially of $LiTi_2O_4$.

12. The cell according to claim 7, wherein said lithium titanate consists essentially of $Li_{4/3}Ti_{5/3}O_4$.

13. The cell according to claim 7, wherein said lithium salt in said electrolytic solution is a member selected from the group consisting of $LiPF_6$, $LiCF_3SO_3$, $LiBF_4$, $LiClO_4$, $LiN(CF_3SO_2)_2$ and mixtures thereof.

* * * * *